(12) United States Patent
Anderson

(10) Patent No.: US 9,456,581 B2
(45) Date of Patent: Oct. 4, 2016

(54) SECURITY GATE COMBINED WITH A CATTLE GUARD

(76) Inventor: Robert Wesley Anderson, Wichita Falls, TX (US)

(*) Notice: Subject to any disclaimer, the term of this patent is extended or adjusted under 35 U.S.C. 154(b) by 615 days.

(21) Appl. No.: 13/303,414

(22) Filed: Nov. 23, 2011

(65) Prior Publication Data

US 2015/0156984 A1 Jun. 11, 2015

(51) Int. Cl.
*A01K 3/00* (2006.01)
*A01K 1/00* (2006.01)
*E01F 13/12* (2006.01)
*E04H 17/14* (2006.01)

(52) U.S. Cl.
CPC .............. *A01K 3/002* (2013.01); *A01K 1/0017* (2013.01); *E01F 13/126* (2013.01); *E04H 17/1413* (2013.01)

(58) Field of Classification Search
CPC ........ A01K 3/00; A01K 3/002; A01K 15/04; A01K 1/0017; A01K 1/0023; A01K 1/0029; E06B 11/02; E06B 11/022; E06B 11/023; E06B 11/025; E06B 11/027; E04H 17/14; E04H 17/1413; E01F 15/14; E01F 13/08
See application file for complete search history.

(56) References Cited

U.S. PATENT DOCUMENTS

| | | | |
|---|---|---|---|
| 117,600 A | 8/1871 | Caton | |
| 575,921 A | 1/1897 | Compton | |
| 603,163 A * | 4/1898 | Ball | 49/131 |
| 645,240 A | 3/1900 | Wallace | |
| 653,128 A | 7/1900 | Adams | |
| 696,153 A | 3/1902 | Warren et al. | |
| 832,335 A | 10/1906 | McDonald | |
| 890,324 A | 6/1908 | Allen | |
| 931,537 A | 8/1909 | Wheeler | |
| 1,048,330 A | 12/1912 | Martin | |
| 1,259,581 A | 3/1918 | Zorn | |
| 1,298,072 A | 3/1919 | McNabney et al. | |
| 1,479,736 A | 1/1924 | Petty | |
| 1,509,739 A | 9/1924 | McLean | |
| 1,529,460 A | 3/1925 | Bremer | |
| 1,569,235 A | 1/1926 | Plunkett | |
| 1,620,348 A | 3/1927 | Hernton | |
| 1,653,716 A * | 12/1927 | Martin | 49/131 |
| 1,668,238 A | 10/1928 | Kamas | |
| 1,714,820 A | 5/1929 | Rounsborg et al. | |
| 1,757,025 A * | 5/1930 | Stringfellow | 49/131 |
| 1,763,414 A * | 6/1930 | Adams | 49/131 |
| 1,854,093 A * | 4/1932 | Anderegg | 49/58 |
| 1,860,571 A | 5/1932 | Bauer | |
| 1,915,181 A * | 6/1933 | Boultinghouse | 49/131 |
| 2,024,063 A | 12/1935 | Roper | |
| 2,512,740 A | 6/1950 | Evans | |
| 2,518,855 A | 8/1950 | Balzer | |
| 2,535,795 A | 12/1950 | Henningsen | |
| 2,536,214 A | 1/1951 | Warner | |
| 2,591,220 A | 4/1952 | Wetler | |
| 2,592,225 A | 4/1952 | Winkler | |

(Continued)

*Primary Examiner* — Jonathan Masinick
(74) *Attorney, Agent, or Firm* — Emerson Thomson Bennett, LLC; Daniel A. Thomson

(57) ABSTRACT

A security gate is disclosed, including a pit, wherein the pit has a length and a width, at least one gate post, and a gate panel, wherein the gate panel is made up of multiple, spared apart structural members, wherein the gate panel is rotatably attached to the at least one gate post, wherein the gate panel has a length and a width, wherein the length of the pit and the length of the pit are substantially similar such that when the gate panel is horizontal it covers the length of the pit.

8 Claims, 4 Drawing Sheets

(56) References Cited

U.S. PATENT DOCUMENTS

| | | |
|---|---|---|
| 2,618,469 A | 11/1952 | Mayer |
| 2,710,173 A | 6/1953 | Manuel et el. |
| 2,644,574 A | 7/1953 | Thede |
| 2,744,728 A | 5/1956 | Melchert et al. |
| 2,750,157 A | 6/1956 | van Alsburg |
| 2,790,626 A | 4/1957 | Harford |
| 2,800,304 A | 7/1957 | van Alsburg |
| 2,758,399 A | 8/1958 | Youle et al. |
| 2,846,194 A | 8/1958 | Wells |
| 2,899,174 A | 8/1959 | Wells |
| 2,950,091 A | 8/1960 | Arrington |
| 3,256,637 A | 6/1966 | Torrey |
| 3,296,741 A * | 1/1967 | Lubmann .................. 49/131 |
| 3,322,399 A | 5/1967 | Sawyers et al. |
| 3,384,352 A | 5/1968 | Bruner |
| 3,491,480 A | 1/1970 | Nickel et al. |
| 3,491,482 A | 1/1970 | Wedekind |
| 3,516,202 A | 6/1970 | Justice |
| 3,623,267 A | 11/1971 | Williams |
| 3,719,004 A | 3/1973 | Shivers |
| 3,744,185 A | 7/1973 | Patterson |
| 3,748,782 A | 7/1973 | Reynolds |
| 3,790,135 A | 2/1974 | Christianson |
| 3,971,546 A | 7/1976 | Bruner |
| 4,138,095 A | 2/1979 | Humphrey |
| 2,938,711 A | 5/1980 | Luff |
| 4,387,882 A | 6/1983 | Mansour et al. |
| 4,434,975 A | 3/1984 | Tompkins |
| 4,576,509 A | 3/1986 | Beaty, Sr. |
| 4,609,184 A | 9/1986 | Elkins, Sr. |
| 4,655,435 A | 4/1987 | Joseph, Jr. et al. |
| 4,708,515 A | 11/1987 | Davies |
| 4,789,137 A | 12/1988 | Heldenbrand |
| 4,844,423 A | 7/1989 | Combs |
| 5,099,610 A | 3/1992 | Klatt |
| 5,131,631 A | 7/1992 | Cobbe |
| 5,160,120 A | 11/1992 | Sims |
| 5,179,801 A | 1/1993 | Babchuk et al. |
| 5,203,544 A | 4/1993 | Webb |
| 5,248,215 A | 9/1993 | Fladung |
| 5,419,537 A | 5/1995 | Thompson |
| 5,595,370 A | 1/1997 | Heck |
| 6,227,523 B1 | 5/2001 | Haberlen |
| 6,896,443 B1 | 5/2005 | Ousterhout et al. |
| 7,258,505 B2 | 8/2007 | Dehart |
| 7,320,557 B1 | 1/2008 | Potter |
| 7,563,051 B2 | 7/2009 | Buckley et al. |
| 8,006,435 B2 | 8/2011 | DeBlonk et al. |
| 2010/0001245 A1* | 1/2010 | Drax .................. 256/17 |

* cited by examiner

SECURITY GATE COMBINED WITH A CATTLE GUARD

BACKGROUND OF THE INVENTION

The invention relates to the improvements in Cattle Guards and Crash Resistant Gates. Prior art has provided various configurations of Cattle Guards. "Cattle Guards" are horizontal grids at ground level built flush into a road surface, combined with a pit underneath the grid, the intention of which is to prevent the passage of livestock along the roadway. Livestock will not cross over a grid with visually open gaps; therefore the requirement for the pit below the grid.

Crash Resistant Security Gates in prior art are commonly configured as pop-up roadway barriers to stop and trap vehicles which attempt to crash through the gate.

A rural or suburban land owner with livestock and desiring a driveway security gate used in conjunction with a cattle guard, cannot use a Crash Resistant Gate due to the limitations of current art. The landowner is forced to use a conventional swinging or sliding gate, requiring the following equipment and facilities installation procedure extending over multiple days:

(1) Excavation of a pit in the roadway. Optimally this pit is lined with concrete to prevent subsidence of the pit walls, to prevent vegetation growth in the pit, and to provide a ballasting foundation for the passage of heavy vehicles over the cattle guard.
(2) The fabrication and placement of a grid over the pit.
(3) The fabrication and placement of a swinging gate to function in conjunction with the property fence to prevent vehicles passage. Optimally vehicle gates are combined with automatic actuators to swing the gate open/closed. Conventional Swinging Gates have no provision for energy recovery, so therefore commonly require moderate to large energy consumption (commonly large automotive style chemical storage batteries).

In summary of prior art, a landowner is often required to be without the entrance to their property for multiple days during a conventional Cattle Guard/Security Gate installation. Prior art providing limited or no crash resistant security, and consumes more energy and fabrication materials versus the subject invention.

U.S. Pat. No. 5,595,370 to Heck attempts to combine these functions in an industrial/commercial setting through the use of multiple small swinging panels of which the full weight are manually lifted into the open and closed positions, and then secondly require manual locking in position. Furthermore, this prior art in application requires a multi-step site installation procedure if one desires more than a temporary installation of this gate so as to maintain an effective pit under the Cattle Guard.

U.S. Pat. No. 4,576,509 to Beaty provides a crash resistant gate with pit, but does not provide for livestock protection via a cattle guard and requires a large separate power activation installation.

The subject invention provides the following innovations over prior art:

(1) A Cattle Guard and Security Gate combined into one unique device.
(2) Gate activation energy recovery.
(3) Powered gate function integrated into the mechanical design of the invention.
(4) Unitized modular design with an integral pit/culvert.
(5) Provides a vertical structure via the Gate Posts to:
   a. Facilitate integration with adjacent security fencing
   b. Protect and hide the activation mechanism
   c. Provide mounting structure for solar panels and area lighting
(6) Single gate panel provides taller, more visually effective barrier to traffic and foot trespass (prior art has short multiple panels due to manual lifting constraint).
(7) Less material usage (lower cost) due to:
   a. Swinging gate panel performing dual functions of gate panel and cattle guard
   b. Less mechanical complexity due to panel hinging on one side only versus prior art with multiple hinges
   c. No locking hasps or locking hardware required.
(8) Modular installation versus 3 step prior art installation for permanent installations
(9) Elimination of manual "down lock" procedure in U.S. Pat. No. 5,595,370 to Heck
(10) Subject invention requires a single gate panel versus U.S. Pat. No. 4,576,509 to Beaty representing prior art in Crash Resistant Gates requiring multiple panels to separately block traffic and to protect the opening in the roadway.

In addition, prior art is generally limited to industrial and commercial applications due to heavy gate panel manual lifting limitations, aesthetic limitations, and maintenance and site stability considerations.

OBJECTS AND SUMMARY OF THE INVENTION

The general object of the present invention is to combine the functions of a Cattle Guard with a Crash Resistant Security Gate. The invention, functioning as a cattle guard, will provide a livestock barrier function and whose same members will also function as a Crash Resistant Security gate to road traffic. Wherein the function of two prior pieces of equipment are combined into one single piece of equipment; utilizing less material, simplifying installation, and using less input energy than any prior art.

The invention is configured as a base frame lying in horizontal plane combined with a culvert or pit, normally of pre-cast concrete. This base frame is installed with the top of the frame flush with the road surface. Attached and projecting vertically up from the base frame are the Gate Posts. The Gate Posts are used to integrate into and attach to the property security fence. The Gate Posts can optimally enclose the gate power supply, controls, and the energy recovery and activation mechanisms. A swinging Gate Panel is hinged along its long side, with the hinges fixed to the base frame. The Gate Panel is configured of parallel bars spaced to form a grid. When swung up vertically the Gate Panel blocks vehicle traffic. When swung down to the horizontal position the Gate Panel becomes a Cattle Guard, serving to allow the passage of vehicles, but to also block the passage of livestock.

When activated by a legitimate person seeking vehicle access, the Gate Panel lowers from vertical to horizontal position. During this transition, the significant weight of the Gate Panel, existing as potential energy, is recovered and converted to mechanical energy via springs enclosed within the Gate Posts/Base frame. When the Gate is closed, the process is reversed, and the gate Panel is restored to its vertical position. This energy recovery process reduces energy input required to power the gate function.

The Cattle Guard and Gate Panel functions are combined, so during manufacture, a reduction in input fabrication materials is realized. The invention, utilizing a concrete base cast off-site and made integral with the invention, can then be transported to the point of use as a module. The landowner can realize a gate installation time duration in a matter of hours, versus several days required for a permanent installation of prior art.

With the preferred embodiment of enclosing all gate power and activation components within the Gate Posts, no separate additional enclosures are required at the site for batteries, or controls. Additionally, all mechanical activation arms are enclosed within the Gate Posts to prevent damage from passing vehicles or tampering by potential trespassers.

BRIEF DESCRIPTIONS OF THE VIEWS OF DRAWINGS

DETAILED DESCRIPTION OF THE PREFERRED EMBODIMENT

Figure 1:
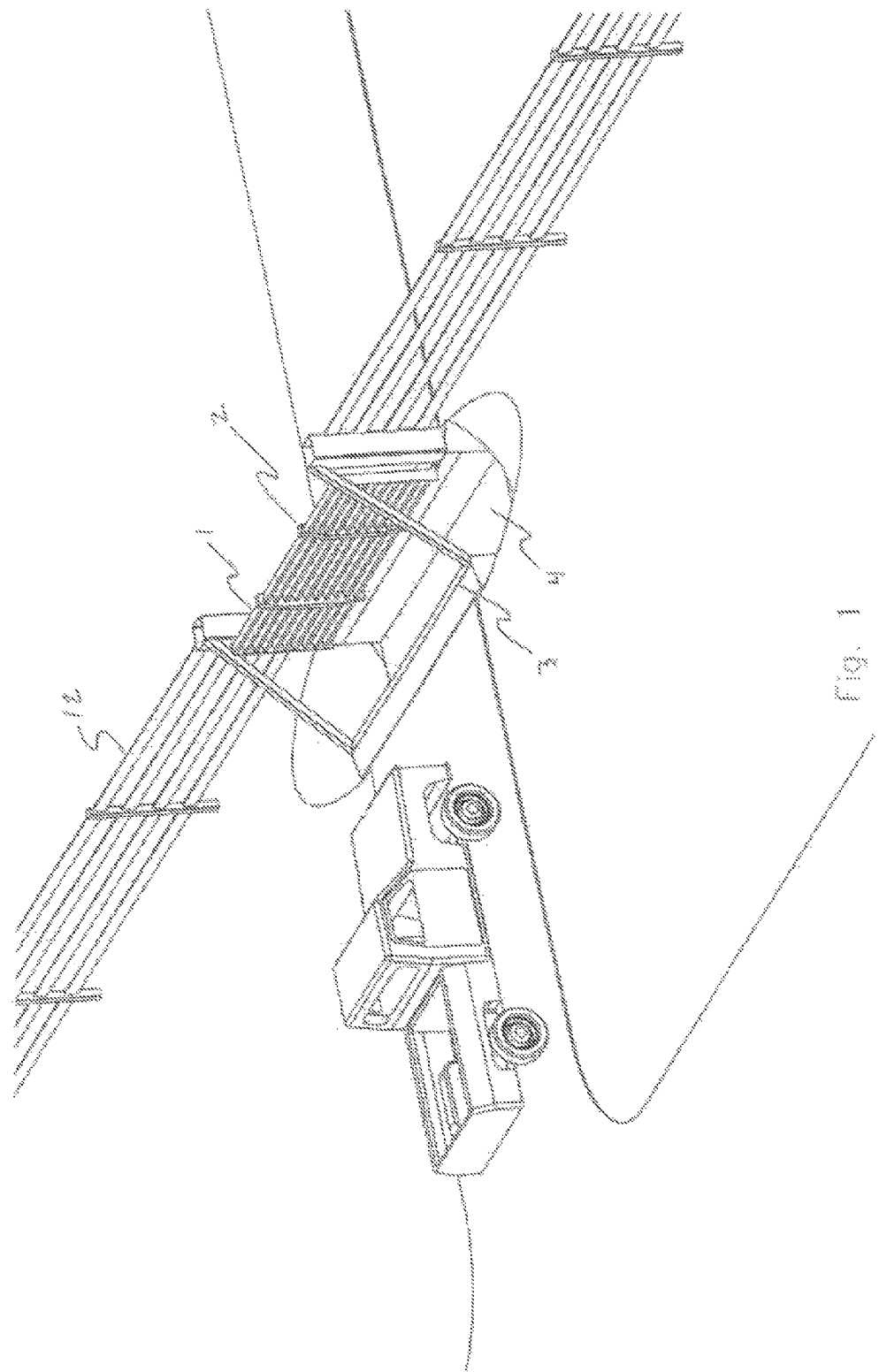
FIG. 1 is a perspective view of the invention in a typical site installation, shown with the invention integrated into a security fence, and the Gate in the "closed" position.
Figure 2:
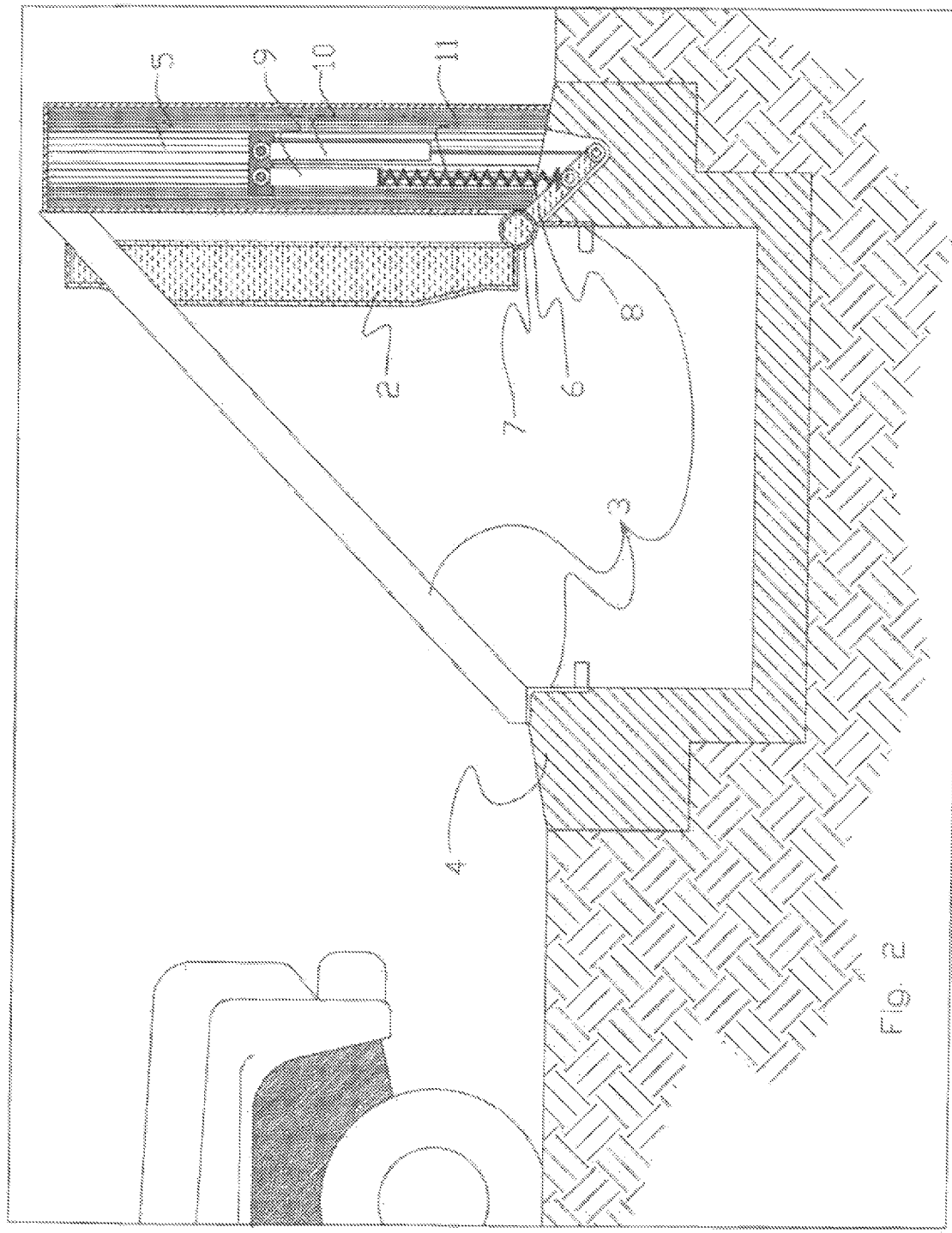
FIG. 2 is a section view of the invention in which the gate is in the closed position, and shows the gate activation and energy recovery mechanisms.
Figure 3:
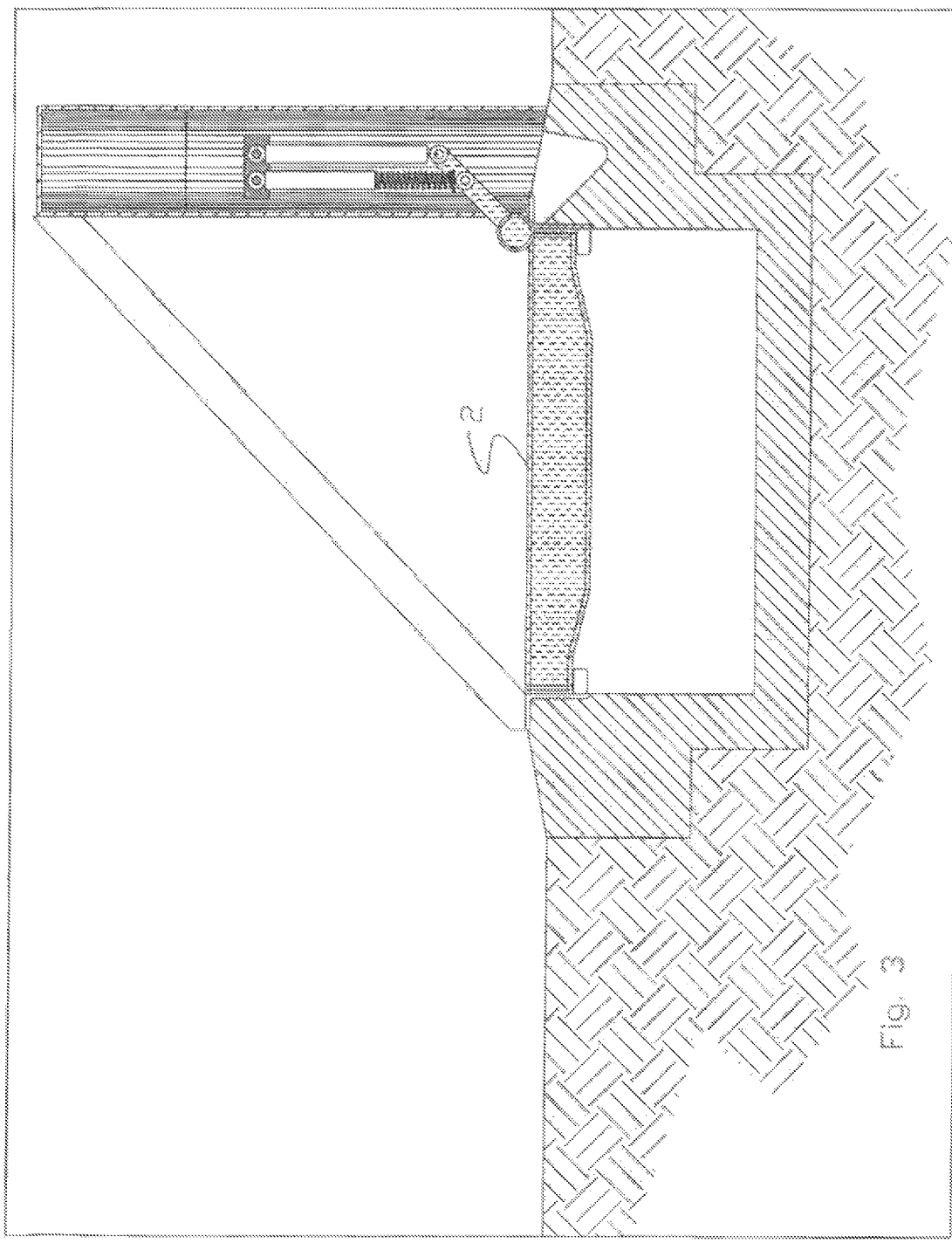
FIG. 3 is a section view of the invention in the open position.

The subject invention is a device which functions integrally with a property boundary fence 12 FIG. 1, cross fence, or any other configuration of security and/or livestock fencing. The device consists of a grid of structural members 1 FIG. 1, which combined together, form the main panel 2 of the device. The main panel is mounted within frame 3. Frame 3 FIG. 2 is supported by concrete base 4. Concrete Base 4 is configured as a culvert which is bridged by the swinging panel 2 when the panel is resting in the horizontal position FIG. 3. When the panel is swung to the vertical position FIG. 2, the concrete base forms an un-crossable barrier pit to vehicle traffic. There are vertical gateposts 5 FIG. 2 attached to frame 3. Each gatepost 5 includes an attached tubular bearing support assembly 7. Trunnions 6, which are attached to main panel 2, reside and freely rotate within tubular bearing support assembly 7. Gate posts 5 contain bell cranks 8 FIG. 2, which are attached to the trunnions 6. Along the arm lengths of bell cranks 8 are attachment points for actuator 9, energy recovery device 11, and optionally dashpot 10. The opposite ends of actuator 9 and dashpot 10, which are not attached to bell crank 8, are attached to gatepost 5. The energy recovery counter balance 11 can be configured as a compression or tension spring. Other counter balance 11 configurations can be as a torsion bar, hydraulic accumulator, torsion spring, gas spring, or other device for recovering gate potential energy.

Figure 4:
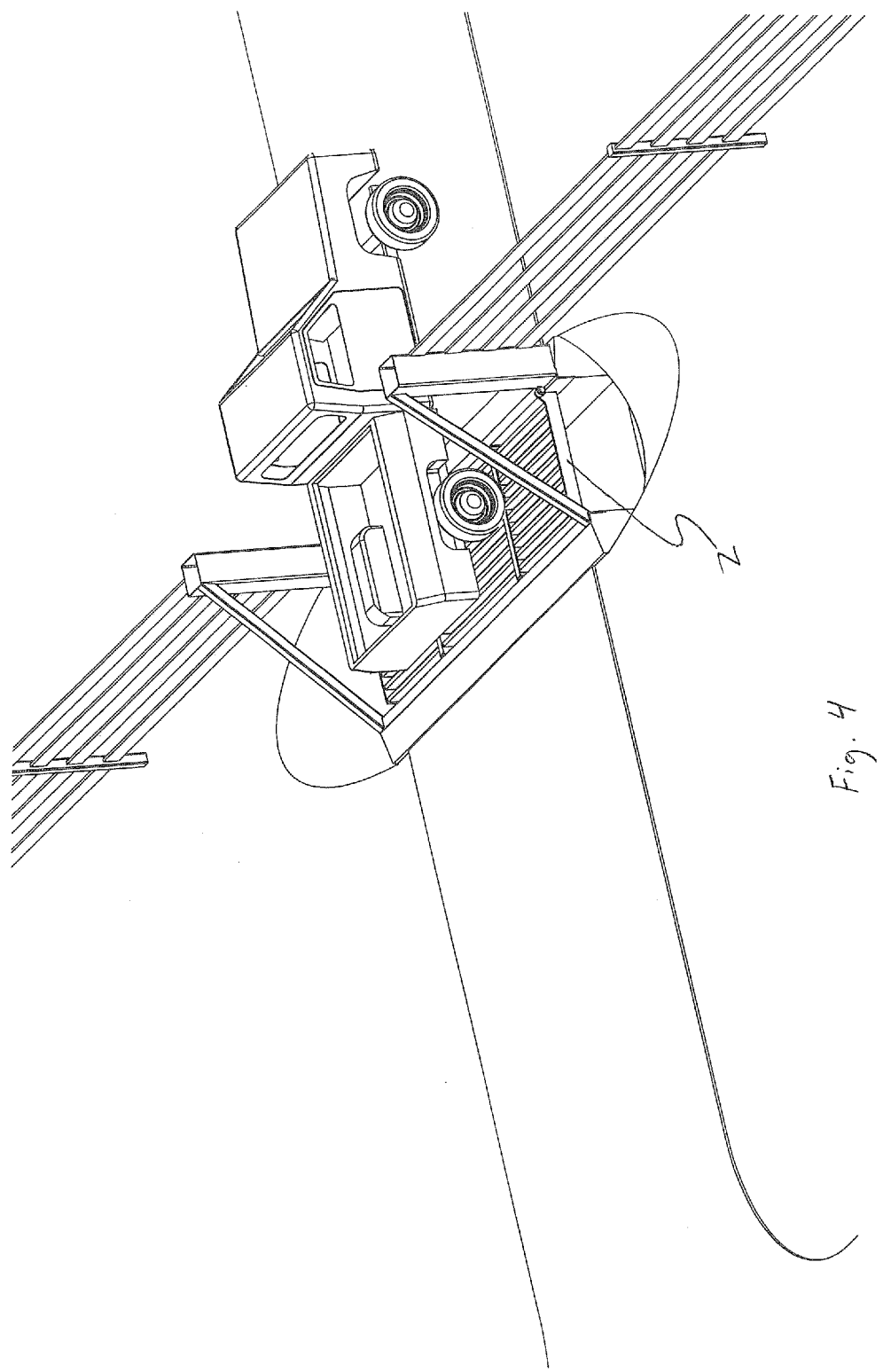
FIG. 4 is a perspective view of the invention in the "open" position allowing passage of vehicular traffic, but preventing livestock passage.

In operation, main panel 2 FIG. 1 swings from vertical to horizontal positions. When in the vertical position, main panel 2 and the pit in concrete base 4 function as a security gate barrier integral with fence 12. When in the horizontal position, main panel 2 FIG. 4 functions as a "cattle guard" which allows vehicular traffic, but blocks the passage of livestock. From the vertical position, when activated by the property owner, actuator 9 FIG. 2 lowers main panel 2. The speed of the descent can be modulated by dashpot 10. The energy recovery device 11 absorbs the potential energy of the falling mass of main panel 2. When lying perfectly flat, main panel 2 will now support the weight of vehicular traffic. When the property owner desires to close the gate, actuator 9 is activated, which, combined with the stored energy in device 11, raises the main panel 2 to the vertical closed position.

The subject invention can also contain any of the following additional features: lighting source(s) integral with the gate structure, swinging barrier(s) to mark the open pit when main panel 2 is in the vertical closed position, a solar powered actuator, remote powered actuator, audio/video communication capabilities with the property owner, access key pad(s), remote control devices including both radio frequency and infrared transmitters/receivers, gate motion warning flashers and/or enunciators, emergency stop device (s), emergency first responder override key locks, light reflective warning strips, and obstruction sensors to avoid entrapment during gate motion. Obstruction sensors can be configured singly or in combinations of the following: light beams/light curtains, ultrasonic proximity detectors, capacitance contact sensors, electrical contact strips, or air pressure bumper strips. Main panel 2 can be configured to stop motion immediately, and/or be self-reversing, upon sensing obstruction.

I claim:
1. A security gate comprising:
a pit, wherein the pit has a length and a width;
at least one gate post; and
a gate panel, wherein the gate panel is made up of multiple, spaced apart structural members, wherein the gate panel is rotatably attached to the at least one gate post, wherein the gate panel has a length and a width, wherein the length of the pit and the length of the gate panel are substantially similar such that when the gate panel is horizontal it covers the length of the pit, wherein the gate panel has a first position and a second position, wherein the first position is substantially vertical and the second position is substantially horizontal,
an energy recovery counterbalance connected between an actuator and a bell crank to facilitate movement of the gate panel between the first position and second position, wherein the actuator and the counterbalance are located inside the gate post.

2. The security gate of claim 1, wherein the gate further comprises:
a frame, wherein the frame is connected to the pit and the at least one gate post.

3. The security gate of claim 2, wherein the at least one gate post is a first and second gate post having a top and a bottom, wherein the frame has a first member and a second member, wherein the first member and the second member have a first end and a second end, wherein the first ends of the first and second members are connected to the pit and the second ends of the first and second members are connected to the tops of the first and second gate posts, wherein the first and second members are spaced apart to substantially match the width of the gate panel.

4. The security gate of claim 3, wherein the frame has extensions in the pit on which the gate panel rests when in the horizontal position.

5. The security gate of claim 4, wherein the security gate further comprises:
a tabular bearing support assembly attached to the bottom of the gate post;
a trunnion rotatably attached within the support assembly;

the bell crank rotatably connected to the trunnion to facilitate movement of the gate panel between the first position and second position;

the actuator connected to the gate post and the bell crank to facilitate movement of the gate panel between the first position and second position.

6. The security gate of claim 5, the security gate further comprising:

a dashpot connected to the gate post and the bell crank to facilitate movement of the gate panel between the first position and second position, wherein the dashpot is located inside the gate post.

7. The security gate of claim 6, wherein the speed of descent of the gate panel is modulated by the dashpot, wherein the bell crank transfers rotational torque to the gate panel.

8. The security gate of claim 3, wherein potential energy of the gate panel is transferred to the energy recovery counterbalance when the gate panel is lowered, wherein the raising of the gate panel from a horizontal to a vertical position is aided by stored energy in the counterbalance.

\* \* \* \* \*